United States Patent [19]

Wyman

[11] Patent Number: 5,009,924
[45] Date of Patent: Apr. 23, 1991

[54] PROCESS TO PERMIT IMPROVEMENT OF FUNCTIONAL PROPERTIES OF POLYOLEFIN ARTICLES BY ELECTRON-BEAM INITIATED POLYMERIZATION

[75] Inventor: John E. Wyman, Westford, Mass.

[73] Assignees: Energy Sciences Inc., Wilmington, ; a part interest; Marjorie T. Wyman, Westford, both of Mass.

[21] Appl. No.: 427,372

[22] Filed: Oct. 27, 1989

Related U.S. Application Data

[62] Division of Ser. No. 254,817, Oct. 7, 1988, abandoned, which is a division of Ser. No. 110,472, Oct. 19, 1987, Pat. No. 4,803,126.

[51] Int. Cl.$^5$ .............................. B05D 3/06; B05D 3/00
[52] U.S. Cl. ........................................ 427/44; 427/331; 427/407.1
[58] Field of Search ................ 427/44, 331, 407.1; 428/447, 448; 522/60, 84

[56] References Cited

U.S. PATENT DOCUMENTS

| 2,140,048 | 12/1938 | Fikentscher et al. | 260/2 |
| 2,160,054 | 5/1939 | Bauer et al. | 260/84 |
| 3,663,261 | 5/1972 | Miettinen et al. | 427/44 |
| 3,719,539 | 3/1973 | Lamb et al. | 522/60 |
| 3,909,379 | 9/1975 | Gotoda et al. | 522/60 |
| 4,024,040 | 5/1977 | Phalangas et al. | 522/84 |
| 4,066,524 | 1/1978 | Phalangas | 522/60 |
| 4,115,339 | 9/1978 | Restaino | 522/84 |
| 4,761,316 | 8/1988 | Ogawa | 427/44 |
| 4,822,828 | 4/1989 | Swofford | 522/84 |
| 4,891,241 | 1/1990 | Hashimoto et al. | 427/44 |

OTHER PUBLICATIONS

"Handbook of Adhesives," Second Edition, edited by Irving Skeist (1977), pp. 56, 62, 640–652, 655 and 841.
"Silane Coupling Agents," E. Plueddeman (1982), pp. 1–4, 111–138, 162–163 and 167–204.
"The Chemistry of Acrylonitrile," Second Edition, American Cyanamid Company (1959), pp. 29–31.

Primary Examiner—Norman Morgenstern
Assistant Examiner—Marianne L. Padgett
Attorney, Agent, or Firm—Rines and Rines Shapiro and Shapiro

[57] ABSTRACT

A process is described for modifying the surface of polymers such as polyolefins and the like to improve the wetability by barrier and other coatings and to enhance interlayer adhesion by graft polymerization through initiation by electron-beam radiation, optionally with an added electron energy acceptor.

1 Claim, No Drawings

PROCESS TO PERMIT IMPROVEMENT OF FUNCTIONAL PROPERTIES OF POLYOLEFIN ARTICLES BY ELECTRON-BEAM INITIATED POLYMERIZATION

This is a divisional patent application of U.S. Ser. No. 254,817, filed Oct. 7, 1988, now abandoned, which is a divisional application of U.S. Ser. No. 110,472, filed Oct. 19, 1987, now U.S. Pat. No. 4,803,126, granted Feb. 7, 1989.

The present invention relates to processes for coating polymer plastic materials, such as polyolefins and the like, to upgrade their barrier properties for use as packaging and other films impermeable to air or oxygen gas, and/or water vapor or other gases or fluids; the invention being more particularly directed to a novel process for modifying the surface of such polymers, including poly(ethylene), poly(propylene) and poly(vinyl chloride) and the like (the convention being adopted herein of placing in parenthesis the particular olefin to indicate the generic character of the concept), with the aid of appropriate priming materials to modify the surface properties thereof to permit ready bonding and with the aid of electron beam radiation to enhance interlayer adhesion of barrier-type coatings deposited from polymer latex dispersions, and the like.

Previous approaches to improving such barrier properties of, for example, polyolefin films and the like, such as the before-mentioned poly(ethylene) and poly(propylene), as illsutrations, have involved the application of a second polymer layer to the base film, often by extrusion, in which the second polymer film has substantially superior barrier properties against permeation by oxygen, carbon dioxide, water vapor, etc. An example of such a second polymer is poly(vinylidene) chloride. Adhesion of the second polymer to the poly(ethylene) film is difficult to achieve unless the poly(ethylene) has been treated with, for example, a sodium dichromate/sulfuric acid solution, a flame treatment, or a corona discharge. These treatments have the effect of partially oxidizing the surface and raising the surface energy. This allows the surface of the treated poly(ethylene) to be wetted by a liquid adhesive or polymer which would not otherwise spread on untreated poly(ethylene) so that an adhesive bond can be formed between the treated poly(ethylene) and the second polymer. These surface treatments and the explanation of how they promote wetting and adhesion are explained in detail in the *Handbook of Adhesion*, Second Edition, edited by Irving Skeist, 1977, pages 56, 62, 841 and 655, for example.

Silane materials have heretofore also been used to modify surfaces to improve adhesion. Dow Corning Corporation provides a variety of organofunctional silanes which are useful as coupling agents. The strength of glass fiber polymer laminates, for example, has been substantially improved by the use of certain silane coatings on the glass fibers which will graft and bond strongly to specific polymers that otherwise do not wet the glass surface well. This work is discussed, for example, in a book authored by E. Plueddeman of Dow Corning Corporation entitled *Silane Coupling Agents*, 1982, pages 1-4, 111-138 and 167-204. There is also a discussion of silane coupling agents in said *Handbook of Adhesives*, pages 640-652.

Certain of these organofunctional silane coupling agents will also promote adhesion between dissimilar polymers which are otherwise difficult to bond. Bonding of poly(ethylene) to poly(ester) using a hot melt adhesive following the application of the proper coupling agent to each polymer surface is described in detail in Plueddeman's book, above, pages, 162-163.

The mechanism by which these coupling agents improve adhesion of one polymer to another is not well known. The various factors which contribute are discussed in detail in the said Plueddeman book, pages 128-136. It is believed that optimum adhesion occurs when the siloxane of the coupling agent and the polymer matrix interdiffuse to form an interpenetrating polymer network and then crosslink. This is usually accomplished by adding a small quantity of a high temperature peroxide to the coupling agent to aid in the crosslinking reaction, and then processing the thermoplastic polymer composite at a temperature above the melting temperature of the polymer.

This process works well when injection molding mineral fiber or particle filled poly(olefin) polymers, or when the poly(olefin) polymer is laminated to another substrate using a hot melt adhesive. However, a biaxially oriented poly(olefin) film, such as a poly(ethylene) or poly(propylene) film cannot be heated to the melting point of the film without causing it to shrink and lose the desirable properties produced by biaxial orientation of the original polymer film.

I have found that oligomers of a hydrolyzed cationic vinyl benzyl amino silane (Dow Corning Corp.) may be deposited from alcohol solution on the untreated surface of a poly(ethylene) or poly(propylene) film to form, when dried, a smooth uniform layer of a crosslinked organofunctional poly(siloxane). This poly(siloxane) coating has a critical surface tension higher than that of the poly(ethylene) or poly(propylene) and consequently is wetted by a variety of liquid polymers, monomers and polymer latex dispersinos which will not wet the uncoated poly(ethylene) surface. This allows film laminates with poly(olefin) such as poly(ethylene) film or poly(propylene) film as one component to be prepared at ambient temperature using, for example, aqueous polymer disperions as a source of the second polymer.

Even though the polymer deposited from the aqueous dispersion wetted the surface of the poly(ethylene) and poly(propylene) polymer which had been coated with the vinyl benzyl amino cationic silane, the strength of the adhesive bond between the polymers was limited because the low temperature employed to prepare the laminate did not allow the formation of the desired interpenetrating polymer network.

It has been found, furthermore, that unexpectedly the interlayer adhesion was very substantially improved when the laminate was subjected to electron beam radiation. Apparently, the vinyl group of the siloxane is grafted to the surface of the poly(olefin) film and to the polymer deposited on the poly(olefin) film substrate by the influence of the electron beam radiation.

I have also found that two dissimilar polymer films such as poly(ethylene) or poly(propylene) and poly(vinylidene chloride) can be laminated at ambient temperature by first, coating the film surfaces with the hydrolyzed vinylbenzyl amino silane from an alcohol solution and drying to form a crosslinked polysiloxane on the surface; secondly, applying either an acrylic ester or an acrylated urethane liquid adhesive composition to one dried surface; and then rolling the polymer film together with the liquid adhesive composition between them; and finally subjecting the film structure to electron beam radiation to initiate polymerization of the adhesive composition and to graft the silane to the surface of the film substrate.

It has also been determined that certain liquid acrylate ester compositions can be polymerized and grafted to the polysiloxane coating which in turn is grafted to the polymer film surface, by the polymerization initiation characteristics of the electron beam radiation.

It has also been found that by incorporating certain materials which are known to decompose thermally at elevated temperature to form free radicals, such as benzoyl peroxide, monomers which do not polymerize under the influence of electron beam radiation, such as acrylonitrile, can be polymerized and grafted to the polysiloxane when subjected to the electron beam radiation at ambient room temperatures.

An object of the invention, accordingly, is to provide a new and improved process for modifying the surface properties of polymer films and surfaces, such as polyolefins, which are not readily bondable to gas and water barrier materials, by appropriate primer polymers and electron beam radiation, to render the film surfaces readily bondable to such materials and to enhance the interlayer adhesion.

A further object is to provide improved and upgraded films of such character permanently imbued with barrier properties.

Still a further object is to provide such a process in which the barrier materials are used in the form of an aqueous latex to provide such barrier layers, including those that heretofore could not be so employed because of their inability to produce free radicals on electron beam irradiation to initiate polymerization.

An additional object is to provide a novel sub-process involving the rendering of monomers which produce barrier materials and the like capable of electron beam-initiated polymerization with the aid of appropriate acceptor materials.

Other and further objects will be explained hereinafter and are more particularly delineated in the appended claims.

In summary, however, from one of its important aspects, the invention embraces a process for modifying the surface of a polyolefin film and the like to increase the effective surface tension so as to permit wetting thereto by a barrier coating, that comprises, hydrolyzing an organofunctional silane; coating a surface of a polyolefin film with the hydrolyzed silane and drying the same; and electron-beam irradiating the coated surface referably with 2-5 megarads of electron beam energy of about 180 kV) to initiate the further polymerization of the silane-to-silane structure in the hydrolyzed silane and also to graft the same to the polyolefin surface; and coating the silane-surface grafted polyolefin film with the latex polymer having the desired barrier properties. Other features, preferred and best mode embodiments and details are hereinafter presented.

In accordance with the invention, as before outlined, polymer films and similar surfaces such as the before-mentioned polyolefins, are primed with silane polymer material and electron-beam irradiated. The irradiation appears to generate free radicals in the film that in turn initiate further polymerization of the silane and grafts the same to the film surface. This process has been found to increase the surface tension of the film surface and render the same compatible for strong bonding with barrier materials.

As an example, successful experiments have been performed with polyethylene films to which have been applied vinyl benzylamine silane which initially was hydrolyzed in ethanol (or methanol) to produce a silanol; and, in the presence of the base, to provide oligomers with silicon-oxygen-silicon bonds by the elimination of water. The poly(ethylene) or poly(propylene) film was then dipped in the alcohol solution of the hydrolyzed silane and air-dried. It was then subjected to electron-beam radiatioan by passing under a low energy processor of the type described, for example, in U.S. Pat. Nos. 3,702,412, 3,745,396, and 4,100,450 and marketed by the assignee of the present invention under the trademark "Electrocurtain" TM. In some tests, 180 kV electron beam voltage in the two to five megarad region was used to graft the silane to the polyolefin surface of the film. At this point, it was demonstrated that the grafted silane had modified the polyethylene film surface (increased surface tension and wetability) by, for example, noting the uniform spreading of water droplets, instead of their balling-up as on the unprocessed film. The silane-grafted film surface was then coated with an acrylate latex dispersion (and, alternatively with a vinyl acetate latex, or vinylidine chloride latex), observing that the latex wets and uniformly spreads to form a continuous coating on the grafted silane surface and which dries into a continuous polymer film.

It has been found, however, that a stronger adhering coating can be obtained by further treatment with the electron beam. radiation to polymerize and graft the latex coating to the silane coated film.

It is believed that alternative procedures may involve a single electron beam grafting step through the application of the silane and then the latex, drying out of the same on the polyolefin film, and then treating with appropriate electron beam radiation. It appears that the electron beam energy not only initiates the polymerization as above stated, but that it also effects the required grafting and resulting strong bonding or adhesion of the coatings.

It may be desired to laminate or coat with additional materials such as well known acrylate ester and acrylated urethanes which also readily generate free radicals under electron-beam radiation. Underlying the invention is the discovery, however, that a broader range of monomers may also be adapted for such use through the addition of acceptors which can assist in the generation of the free radicals. For example, while methyl acrylate does readily generate free radicals on electron beam radiation, acrylonitrile does not. However, acrylonitrile may be rendered useful as a further coating for the film if an appropriate acceptor is added to it, such as, for example, benzoyl peroxide which has a weak oxygen-to-oxygen bond. The use of the electron beam radiation appears to break that bond and form free radicals that initiate polymerization. Thus,.the invention has provided a way that acrylonitrile and similar monomers with the appropriate acceptor may also be used to produce further polymer layers on the film substrate.

The latter concept of the utilization of the acceptor, moreover, appears to be of broader application, also, than another coating or lamination for the film product. It would appear that this is a useful subprocess for enabling the widening of the types of electron-beam graftable materials that may be used in laminates or coated structures more generally.

The invention is illustrated by the following examples of its application to the improvement of the functional properties of polyolefin film.

Further modifications will occur to those skilled in this art and such are considered to fall within the spirit and scope of the invention as defined in the appended claims.

What is claimed is:

1. A process for modifying the surface of a polyolefin film that comprises, hydrolyzing an organofunctional silane; coating the surface of a polyolefin film with the hydrolyzed silane and drying the same; and electron-beam irradiating the coated surface to initiate the further polymerization of the silane-to-silane structure in the hydrolyzed silane layer and also to graft the same to the polyolefin surface.

* * * * *